United States Patent [19]

Hosokawa

[11] Patent Number: 5,630,167
[45] Date of Patent: May 13, 1997

[54] ELECTRONIC APPARATUS HAVING A PLURALITY OF CONNECTORS EACH CONNECTING ONE OF A PLURALITY OF KINDS OF CARDS

[75] Inventor: Naohiro Hosokawa, Kawasaki, Japan

[73] Assignee: Canon Kabushiki Kaisha, Tokyo, Japan

[21] Appl. No.: 178,436

[22] Filed: Jan. 6, 1994

Related U.S. Application Data

[63] Continuation of Ser. No. 735,759, Jul. 29, 1991, abandoned, which is a continuation of Ser. No. 324,661, Mar. 17, 1989, abandoned.

[30] Foreign Application Priority Data

Mar. 18, 1988 [JP] Japan ................................ 63-63449

[51] Int. Cl.[6] ........................................... G06F 13/00
[52] U.S. Cl. ......................... 395/823; 395/822; 395/281
[58] Field of Search ................................ 395/275, 325, 395/400, 425, 725, 828, 830, 833, 281, 282, 284, 829, 822, 823

[56] References Cited

U.S. PATENT DOCUMENTS

| | | | |
|---|---|---|---|
| 4,373,181 | 2/1983 | Chisholm et al. | 395/275 |
| 4,518,852 | 5/1985 | Stockburger et al. | 235/381 |
| 4,528,644 | 7/1985 | Soderberg et al. | 364/900 |
| 4,530,069 | 7/1985 | Desrochers | 364/900 |
| 4,556,953 | 12/1985 | Caprio et al. | 395/325 |
| 4,589,063 | 5/1986 | Shah et al. | 395/275 |
| 4,660,141 | 4/1987 | Ceccon et al. | 364/200 |
| 4,683,550 | 7/1987 | Jinorick et al. | 364/900 |
| 4,688,172 | 8/1987 | Wright | 395/700 |
| 4,727,475 | 2/1988 | Kiremidjian | 364/200 |
| 4,730,251 | 3/1988 | Aakre et al. | 364/200 |
| 4,750,136 | 6/1988 | Arpin et al. | 364/200 |
| 4,964,038 | 10/1990 | Louis et al. | 364/200 |
| 4,992,976 | 2/1991 | Yonekura et al. | 364/900 |
| 5,038,320 | 8/1991 | Heath et al. | 395/275 |

*Primary Examiner*—Paul V. Kulik
*Attorney, Agent, or Firm*—Fitzpatrick, Cella, Harper & Scinto

[57] ABSTRACT

An electronic apparatus includes a plurality of connectors and a plurality of kinds of integrated circuit cards adapted to be connected to the plurality of connectors. Also provided is a device for assigning each of the plurality of connectors to one of the plurality of kinds of integrated circuit cards. The apparatus also includes a memory for storing information on the assigning performed by the assigning device. An instruction device instructs the apparatus to access a desired integrated circuit card of the plurality of kinds of integrated circuit cards. A controller selects one of the plurality of connectors in accordance with the assigning information stored in the memory upon reception of an instruction from the instruction device and makes accessible only the integrated circuit card connected to the selected connector. As a result, when a particular integrated circuit card is to be accessed, only one integrated circuit card becomes accessible even if a plurality of integrated circuit cards of the same type are mounted on the apparatus.

5 Claims, 8 Drawing Sheets

| FIG. 4A | FIG. 4B |

ELECTRONIC APPARATUS HAVING A PLURALITY OF CONNECTORS EACH CONNECTING ONE OF A PLURALITY OF KINDS OF CARDS

This application is a continuation of application Ser. No. 07/735,759 filed Jul. 29, 1991, now abandoned, which is a continuation of application Ser. No. 07/324,661 filed Feb. 17, 1989, now abandoned.

BACKGROUND OF THE INVENTION

1. Field of the Invention

This invention relates to an electronic apparatus, and more particularly, to an electronic apparatus which is capable of mounting extended IC cards.

2. Description of the Related Art

Examples of electronic apparatus which are capable of mounting extended IC cards include electronic typewriters which edit and print out documents, or the like. IC cards which can be mounted on such typewriters include RAM cards for the extension of text RAM's (used for preparing a document containing a large number of sentences), spelling corrector cards for performing a spelling check of English words, ROM cards for storing patterns of special characters, and the like. Heretofore, IC cards of different kinds differed in size depending on the difference in function, the number of constituent IC chips or the like, and heretofore each kind of IC card has been adapted to be connected to a predetermined exclusive connector on the body of an electronic apparatus.

When the mounting position of an electronic apparatus is thus fixed for each kind of IC card, the general applicability of the electronic apparatus is limited. Recently, owing to progress in semiconductor technology, it has become possible to provide IC cards having an entirely identical shape and size even for different kinds of IC cards, and to provide plural connectors on the body of the electronic apparatus in an identical shape and size for common use. In other words, the signals lines, each of which is input to each connector for extending the body of the electronic apparatus, all have an identical layout.

Figure 7:
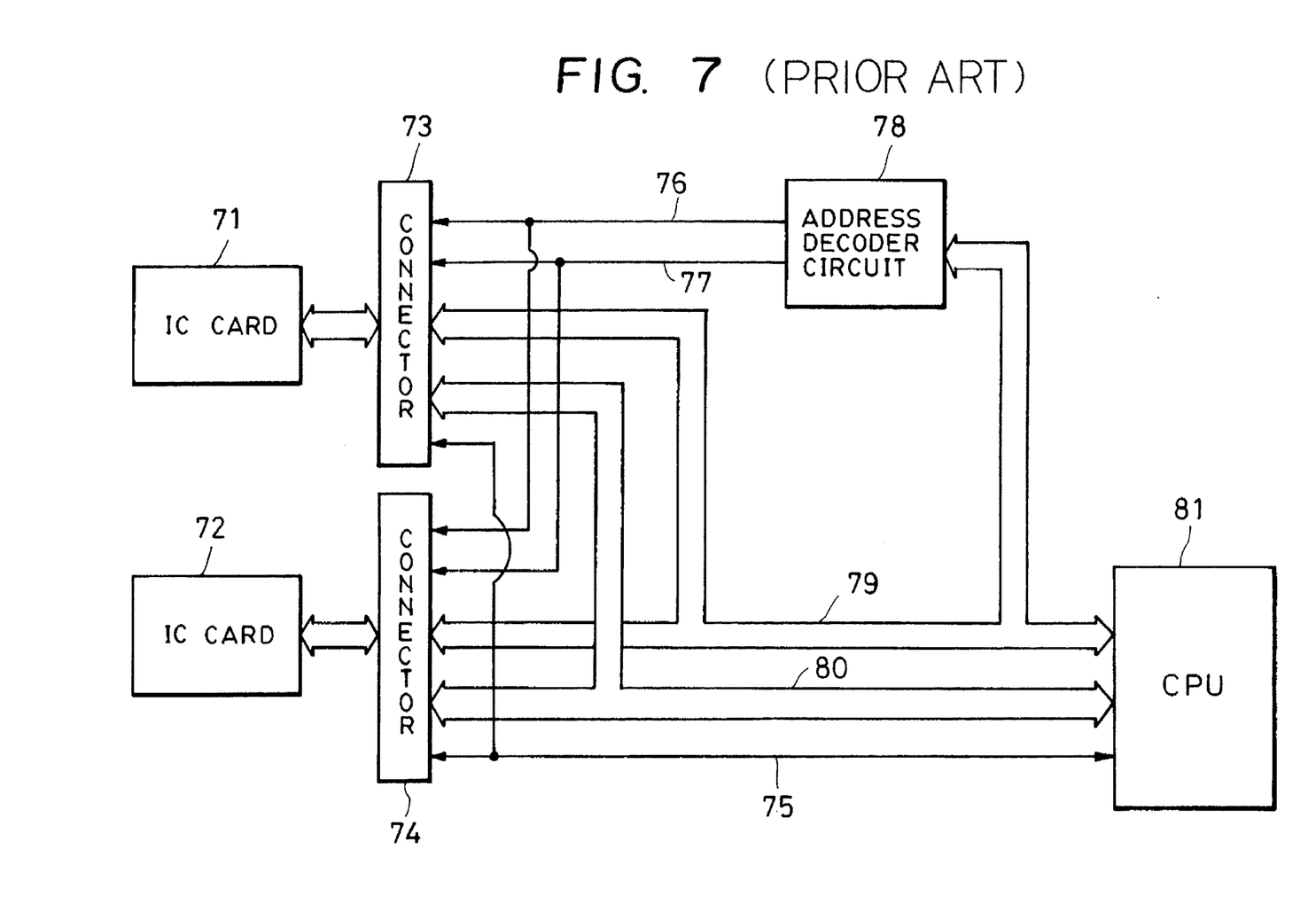
FIG. 7 is a schematic block diagram of an electronic typewriter of the prior art.

This arrangement is illustrated in FIG. 7. In FIG. 7, the connection terminal sides of IC cards 71 and 72 are connected to chip-selection signal lines 76 and 77, respectively. Although, in FIG. 7, the IC card 71 is connected to a connector 73, and the IC card 72 is connected to a connector 74, the combination may also be reversed.

Now, suppose that a CPU 81 accesses the IC card 71. The corresponding address is then output on an address bus 79 for that purpose. The address bus 79 is also connected to an address decoder circuit 78 as shown in FIG. 7. The chip-selection signal line 76 is activated ("1" in the case of positive logic, and "0" in the case of negative logic) by the address decoder circuit 78. The CPU 81 thereby becomes capable of delivering and receiving data to and from the IC card 71 connected to the connector 73 or 74 via a data bus 80.

However, when, for example, in the configuration of FIG. 7, the IC card 72 is exactly the same kind of card as the IC card 71, both cards become simultaneously accessible. When the CPU 81 tries to read data from one of the IC cards, data are almost simultaneously output from each IC card, and thus data from both cards conflict with each other. That is, the electronic apparatus performs an unauthorized operation. This results in a very dangerous state.

SUMMARY OF THE INVENTION

It is an object of the present invention to provide an electronic apparatus for preventing almost simultaneous access to IC cards, when plural IC cards having an identical function are connected thereto.

It is a further object of the present invention to provide an electronic apparatus for assigning one IC card to be accessed among plural IC cards connected thereto, when accessing an IC card having a certain function.

It is a still further object of the present invention to provide an electronic apparatus for assigning only one connection means providing access to an IC card having a certain function among plural connection means to which IC cards are connectable, when accessing an IC card having a certain function.

It is still another object of the present invention to provide an electronic apparatus for assigning a connection means for each IC card for plural connectable IC cards.

It is still a further object of the present invention to provide an electronic apparatus for assigning a memory card for each connection means for plural connection means to which memory cards are connectable.

According to one aspect the present invention which achieves these objectives relates to an electronic apparatus comprising a plurality of connectors, assigning means, storing means, instruction means and control means. Each of the plurality of connectors is adapted to be connected to a plurality of kinds of integrated circuit cards. The assigning means assigns one of the plurality of connectors for each of the plurality kinds of integrated circuit cards adapted to be connected to the plurality of connectors. The storing means stores information on the assigning performed by the assigning means. The instruction means instructs the apparatus to access a desired integrated circuit card of the plurality of kinds of integrated circuit cards. The control means selects one of the plurality of connectors in accordance with the assigning information stored in the storing means, upon reception of an instruction from the instruction means and makes accessible only the integrated circuit card connected to the selected connector.

According to another aspect, the present invention relates to an electronic apparatus comprising a plurality of connectors, assigning means, a plurality of kinds of integrated circuit cards, instruction means, and control means. Each of the plurality of connectors is adapted to be connected to the plurality of kinds of integrated circuit cards. The assigning means assigns each of the plurality of connectors to one of the plurality of kinds of integrated circuit cards. The plurality of kinds of integrated circuit cards are removably connected to the plurality of connectors. Each of the plurality of kinds of integrated circuit cards comprises storing means for storing information on the assigning performed by the assigning means. The instruction means instructs the apparatus to access a desired integrated circuit card of the plurality of kinds of integrated circuit cards. The control means makes accessible a desired integrated circuit card connected to one of the plurality of connectors assigned to the desired integrated circuit card in accordance with the assigning information upon reception of an instruction from the instruction means.

According to another aspect, the electronic apparatus of the present invention comprises a plurality of connectors each of which is adapted to be connected to a plurality of kinds of memory cards, assigning means for assigning the kind of memory card to be connected to each of the plurality of connectors, storing means for storing information on the assigning performed by the assigning means, and instruction means for instructing the apparatus to access a desired memory card of the plurality of kinds of memory cards. The electronic apparatus further comprises control means for making accessible a desired memory card connected to one of the plurality of connectors assigned to the desired memory card in accordance with the assigning information upon reception of an instruction from the instruction means.

DESCRIPTION OF THE PREFERRED EMBODIMENTS

Now, embodiments of the present invention will be hereinafter explained in detail with reference to the accompanying drawings. Although, in the embodiments, an explanation will be provided about the case in which an electronic typewriter is used as an electronic apparatus, any other apparatus may also be used, with the condition that extended IC cards can be mounted thereto.

Figure 1:
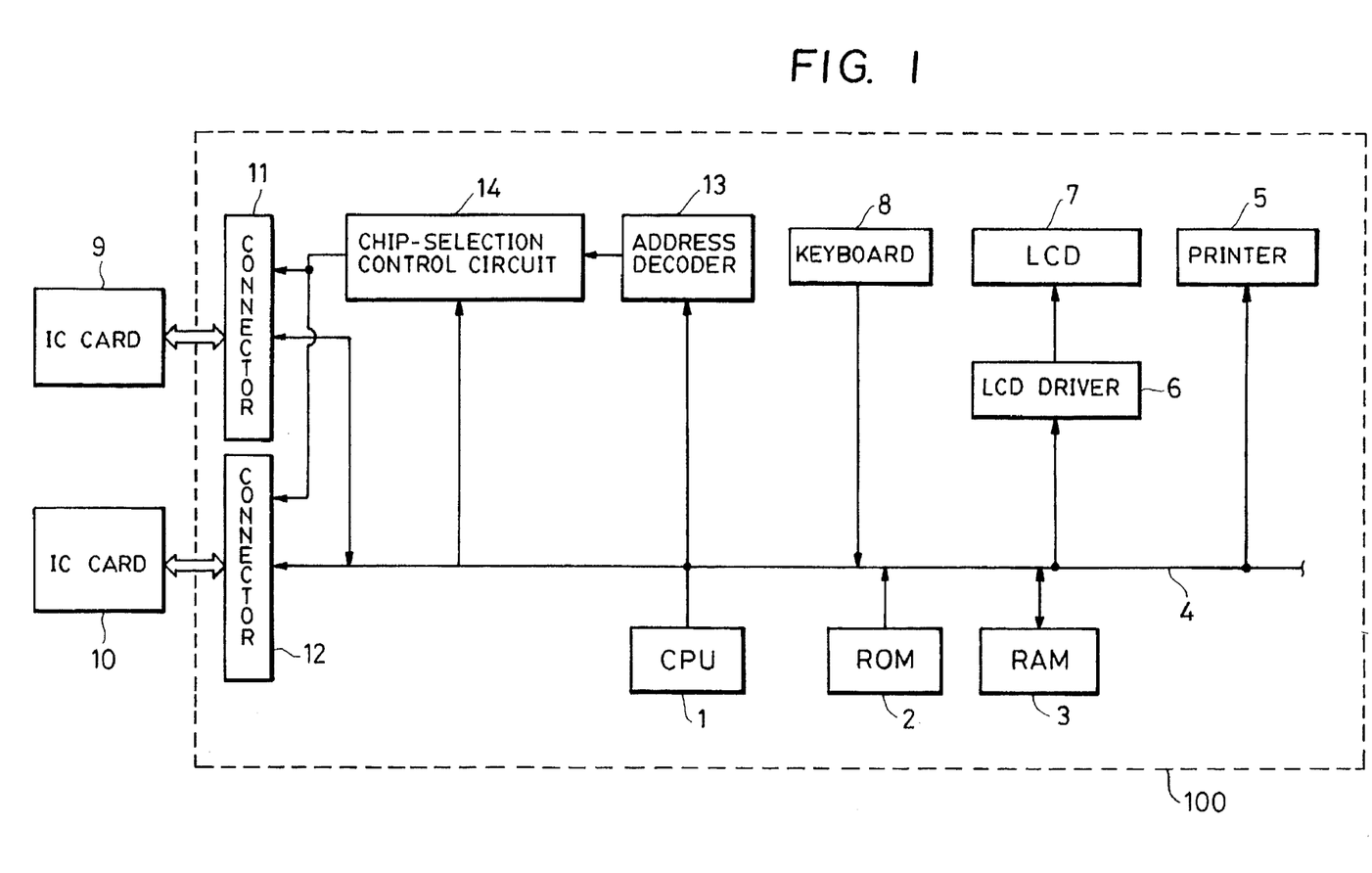
FIG. 1 is a block diagram of an electronic typewriter as an embodiment of the electronic apparatus of the present invention.

FIG. 1 shows the main block diagram of an electronic typewriter of the present embodiment.

In FIG. 1, the body of an apparatus 100 includes a CPU 1 for controlling the entire apparatus and other components which will be described hereafter. Each component is electrically connected by a bus 4 consisting of a data bus, an address bus and control lines.

Figure 4:
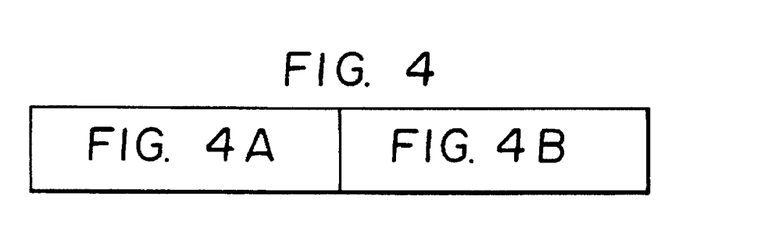
FIG. 4 is a schematic drawing of the relationship between FIGS. 4A and 4B.
Figure 4A:
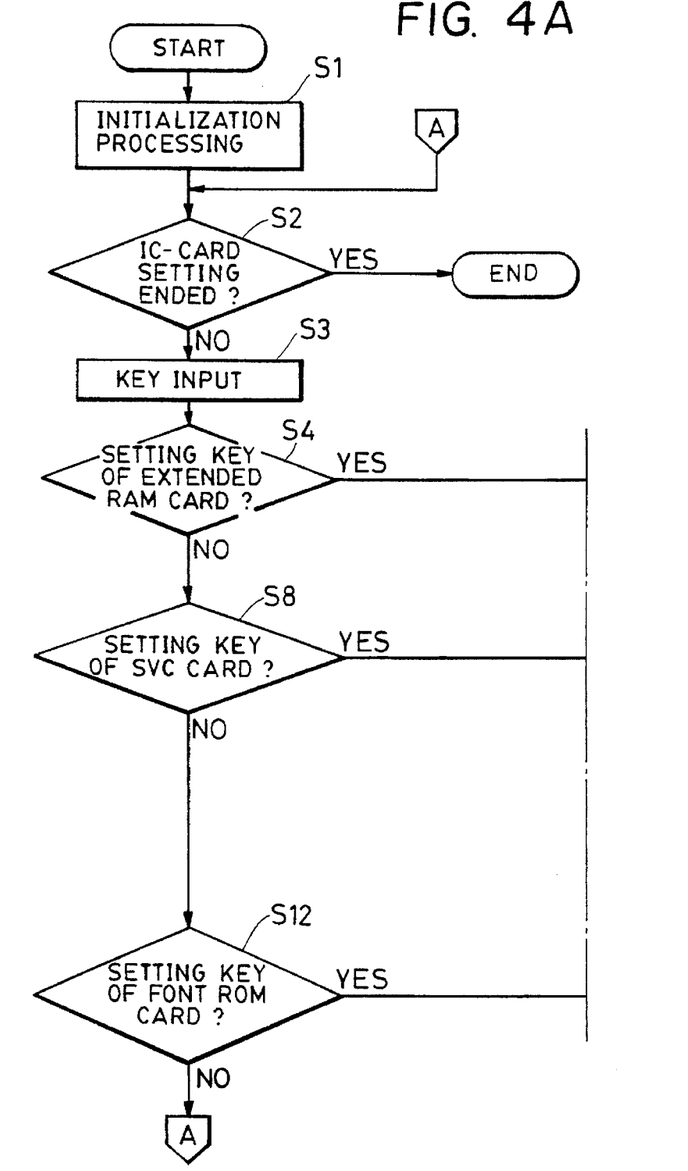
FIGS. 4A and 4B are flow charts showing a processing procedure of a CPU in the first embodiment.
Figure 4B:
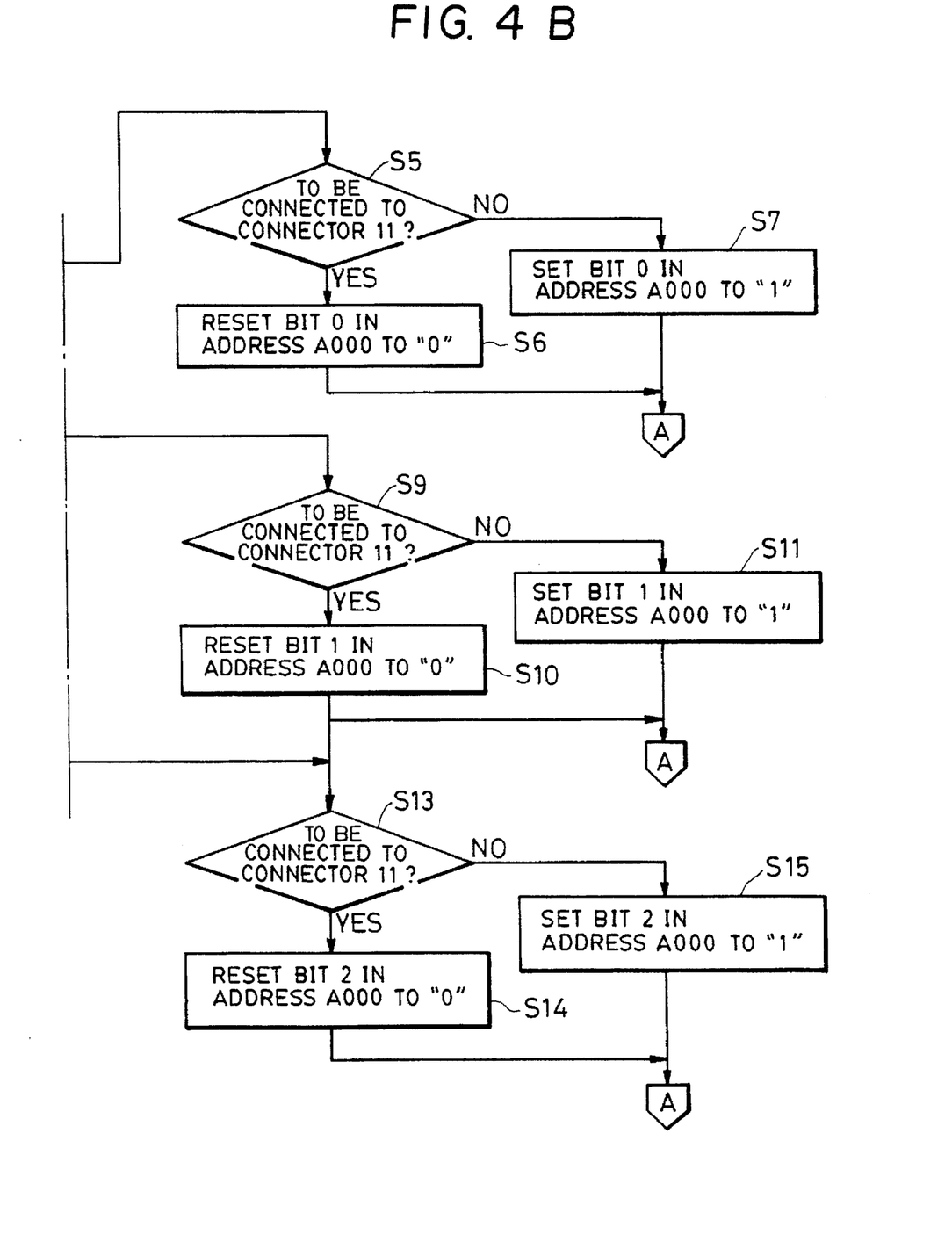

A read-only memory (ROM) 2 stores control processing procedures (programs) of the CPU 1, editing programs for an electronic typewriter, a program whose steps are shown in the flow chart of FIGS. 4, 4A, and 4B which will be described later, and the like. The ROM 2 also stores basic character-font patterns used for printing by a printer 5 or used for display in a liquid crystal display (termed hereinafter LCD) 7. A random access memory (RAM) 3 includes a working area of the CPU 1 and stores document data which have been prepared and edited.

The printer 5 prints out characters and the LCD 7 displays pictures. An LCD driver 6 for driving the LCD also includes a video RAM for display. A keyboard 8 inputs various kinds of information into the apparatus.

IC (integrated circuit or memory) cards 9 and 10 are electrically connected to the body 100 of the apparatus by being inserted in connectors 11 and 12, respectively. Each IC card becomes operable when an address decoder 13 decodes address information generated when the CPU 1 tries to access the IC card, and a chip-selection control circuit 14 receives a chip-selection signal. The chip-selection control circuit 14 will be described later in detail.

Now, the method of accessing the IC cards in the present embodiment will be hereinafter explained.

Figure 2:
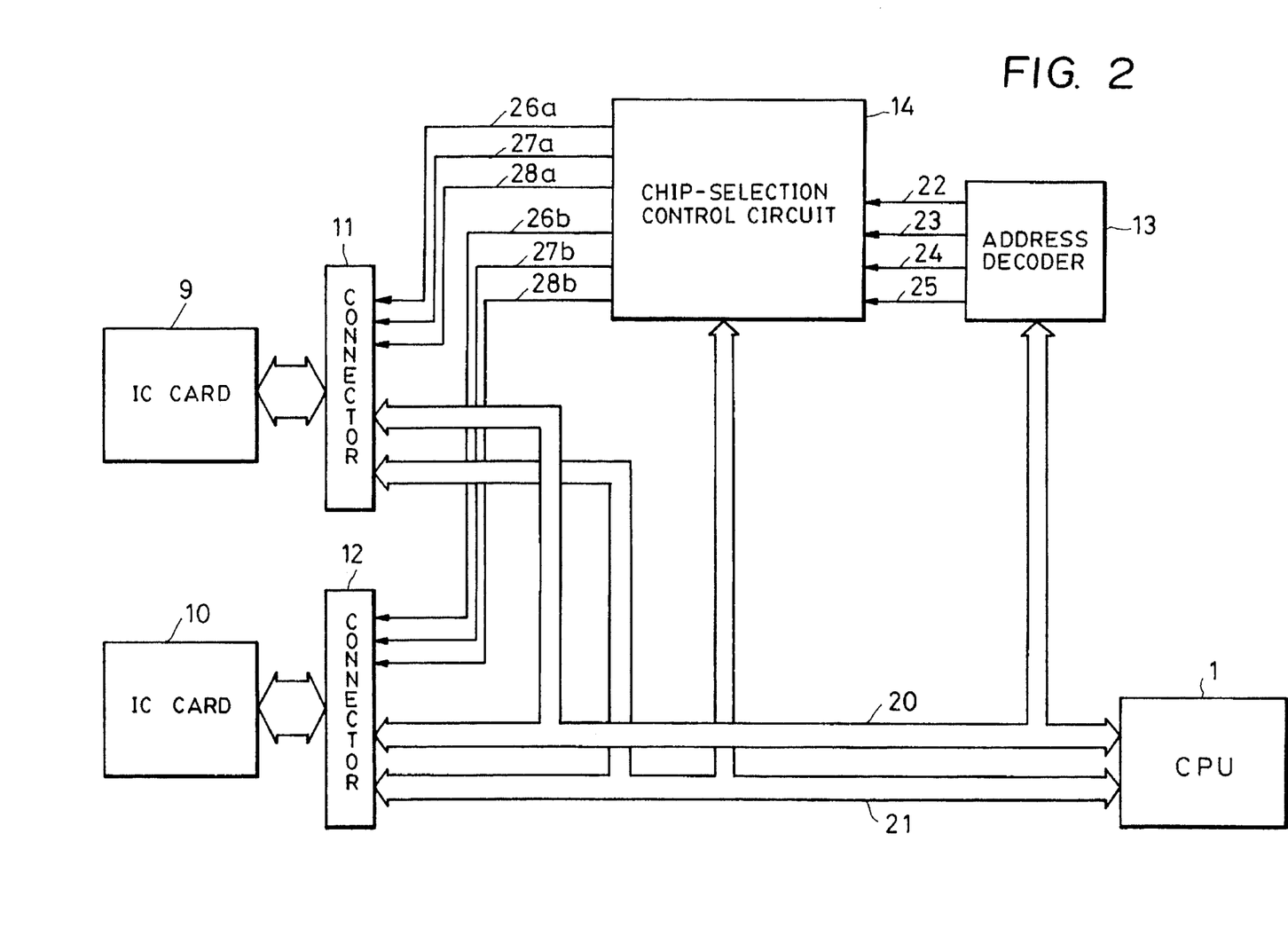
FIG. 2 is a block diagram showing a circuit near the connectors in the first embodiment.

FIG. 2 is a diagram showing that portion of the circuit of FIG. 1 in the neighborhood of each connector for connecting each IC card to the CPU 1. In FIG. 2, control lines for controlling reading/writing and the like are omitted.

It is assumed that IC cards connectable to the electronic typewriter of the present embodiment consist of three kinds, i.e., an extended RAM card for extending the capacity of the random access memory (RAM) 3, a spelling collector card (termed hereinafter an SVC card) for performing a spelling check of English words, and a font ROM card storing extended character font patterns. It is also assumed that these IC cards are connectable to either of the connectors 11 and 12. The layout of connection pins of the connectors 11 and 12 is entirely the same. The connecting member of the extended RAM card includes a line for making itself active at a position corresponding to chip-selection lines 26a or 26b. Similarly, the connecting member of the SVC card includes a line corresponding to chip-selection lines 27a or 27b, and the connecting member of the font ROM card includes a line corresponding to chip-selection lines 28a or 28b.

The address decoder 13 is connected to the chip-selection control circuit 14 by signal lines 22, 23, 24, and 25.

Now, in the present embodiment, in order to access, for example, the IC card 9, the corresponding address is first output on an address bus 20 from CPU 1. The address decoder 13 (operating via negative logic) then outputs a corresponding signal over one of the selection signal lines 22, 23, or 24 to make one of these lines assume a "0" level, depending on the type of card to be accessed (selection signal line 25 will be described later). When the IC card to be accessed is, for example, the extended RAM card, the signal output from address decoder 13 causes only the selection signal transmitted over the selection signal line 22 to assume a "0" level.

Similarly, when the card to be accessed is the SVC card, the signal output from the address decoder 13 causes only the selection signal transmitted over the selection signal line 23 to assume a "0" level. When the card to be accessed is the font ROM card, the signal output from the address decoder 13 causes only the selection signal transmitted over the selection signal line 24 to assume a "0" level.

IC card 10 is accessed in the same manner as IC card 9.

When the chip-selection control circuit 14 receives signals from selection signal line 22, it makes active only either one of chip-selection signal lines 26a and 26b in accordance with the content of a register (to be described later) held therein.

Similarly when the chip-selection control circuit 14 receives signals from selection signal line 23, it activates either selection signal lines 27a or 27b in accordance with the contents of the same register. In a similar fashion, when the chip-selection control circuit 14 receives signals from selection signal line 24, it activates either selection line 28a or 28b in accordance with the contents of the same register.

That is, even when identical extended connectors are connected to the connectors 11 and 12, only one of them assumes an accessible state.

Figure 3:
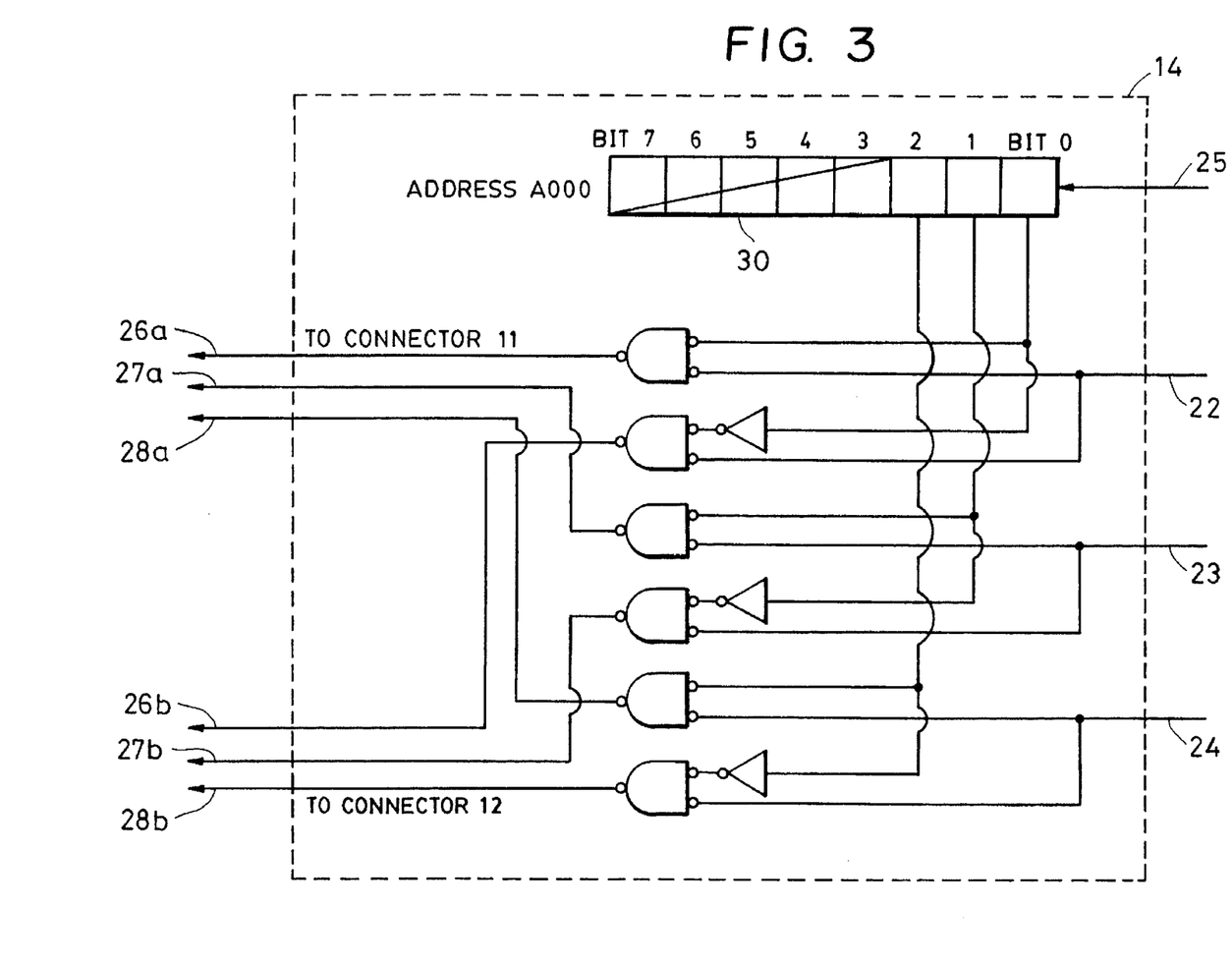
FIG. 3 is a diagram showing the internal configuration of a chip-selection control circuit in the first embodiment.

FIG. 3 shows an example of the internal configuration of the chip-selection control circuit 14.

As shown in FIG. 3, an 8-bit register 30 is provided in the chip-selection control circuit 14 of the first embodiment. The register 30 is at the position of address A000H (H is a symbol indicating a hexadecimal number) viewed from the CPU 1. Accordingly, when the content of the register 30 is to be modified, desired data are written in address "A000H". This is accomplished by the CPU 1 outputting address "A000H" to the address bus 20, Which activates the selection line 25 of the address decoder 13. It is to be noted that in the register 30 only the lowest 3 bits (bits 0-2) are important, and other bits may be arbitrary.

In bit 0 of the register 30, information for selecting one of the chip-selection lines 26a and 26b, which corresponds to the extended RAM card, is stored. When this bit is "0", the chip-selection line 26a (that is, the connector 11) is selected, and when this bit is "1", the chip-selection line 26b (that is, the connector 12) is selected. Similarly, in bit 1, information relative to the selection of the chip-selection lines 27a and 27b, which corresponds to the SVC card, is stored, and, in bit 2, information relative to the selection of the chip-selection lines 28a and 28b, which corresponds to the font ROM card, is stored.

When, for example, data "02H" are written in the register 30, it becomes such that bit 0="0", bit 1="1" and bit 2="0", and the chip-selection lines 26a, 27b and 28a are selected. Hence, the extended RAM card, the SVC card and the font ROM card become connectable to connectors 11, 12 and 11, respectively. In this example, when the extended RAM card is connected to the connector 12, it becomes impossible to access the extended RAM card. Consequently, even if extended RAM cards of the same kind are connected to both connectors 11 and 12, data from both extended RAM cards will not conflict with each other.

Now, based on the above-described principle, the processing procedure of the CPU of the first embodiment will be explained with reference to the flow chart shown in FIGS. 4, 4A, and 4B.

First, when power from a power supply is applied to the electronic typewriter of the present embodiment, the CPU 1 initializes each peripheral circuit at step S1. The process then proceeds to step S2, where CPU 1 determines whether the setting of the IC card has ended or not. When CPU 1 determines that the setting of the IC card has ended, the series of processing steps of the initialization state is terminated, and the process proceeds to perform processing as an electronic typewriter. When the CPU 1 determines that the setting of the IC card has not ended at step S2, the processing steps after step 3 are executed.

At step S3, data relative to the setting of several kinds of IC cards are input from the keyboard 8. Then at steps S4, S8 and S12, the kinds of input keys that have been depressed are determined by the CPU 1, and the corresponding processing steps are executed. These keys include keys for inputting data on the IC card to be accessed (i.e. the extended RAM card, the SVC card, or the font ROM card) and for inputting delta relating to the connector to which each IC card is to be connected (i.e. connector 11 or connector 12) and through which each IC card is properly accessed. This data is stored in RAM 3.

When it has been determined by the CPU 1 that the input key that is depressed is the input key for inputting data relative to the setting of the extended RAM card, the process proceeds from step S4 to S5, where the CPU 1 determines whether or not the extended RAM card is to be connected to the connector 11. When the extended RAM card is to be connected to the connector 11, the step proceeds to step S6, where bit 0 in address "A000" of the register 30 is reset to "0". When the extended RAM card is to be connected to the connector 12, the process proceeds to step S7, where the bit 0 in address register 30 is set to "1".

When the CPU 1 determines that the input key that is depressed is the input key for inputting data relative to the setting of the SVC card, the process proceeds from step S8 to step S9, where the CPU 1 determines whether or not the SVC card is to be connected to the connector 11. When the SVC card is to be connected to the connector 11, bit 1 in address "A000" of the register 30 is reset to "0" (step S10). Otherwise (in the case where the SVC card is to be connected to the connector 12), the bit 1 in address register 30 is set to "1" (step S11).

When the CPU 1 determines that the input key inputs data relative to the setting of the font ROM card, the process proceeds from step S12 to step S13, where the CPU 1 determines whether or not the font ROM card is to be connected to the connector 11. When the font ROM card is to be connected to the corrector 11, bit 2 in address "A000" of the register 30 is reset to "0" (step 14). When the font ROM card is to be connected to the connector 12, bit 2 of register 30 is set to "1" (step 15).

Figure 5:
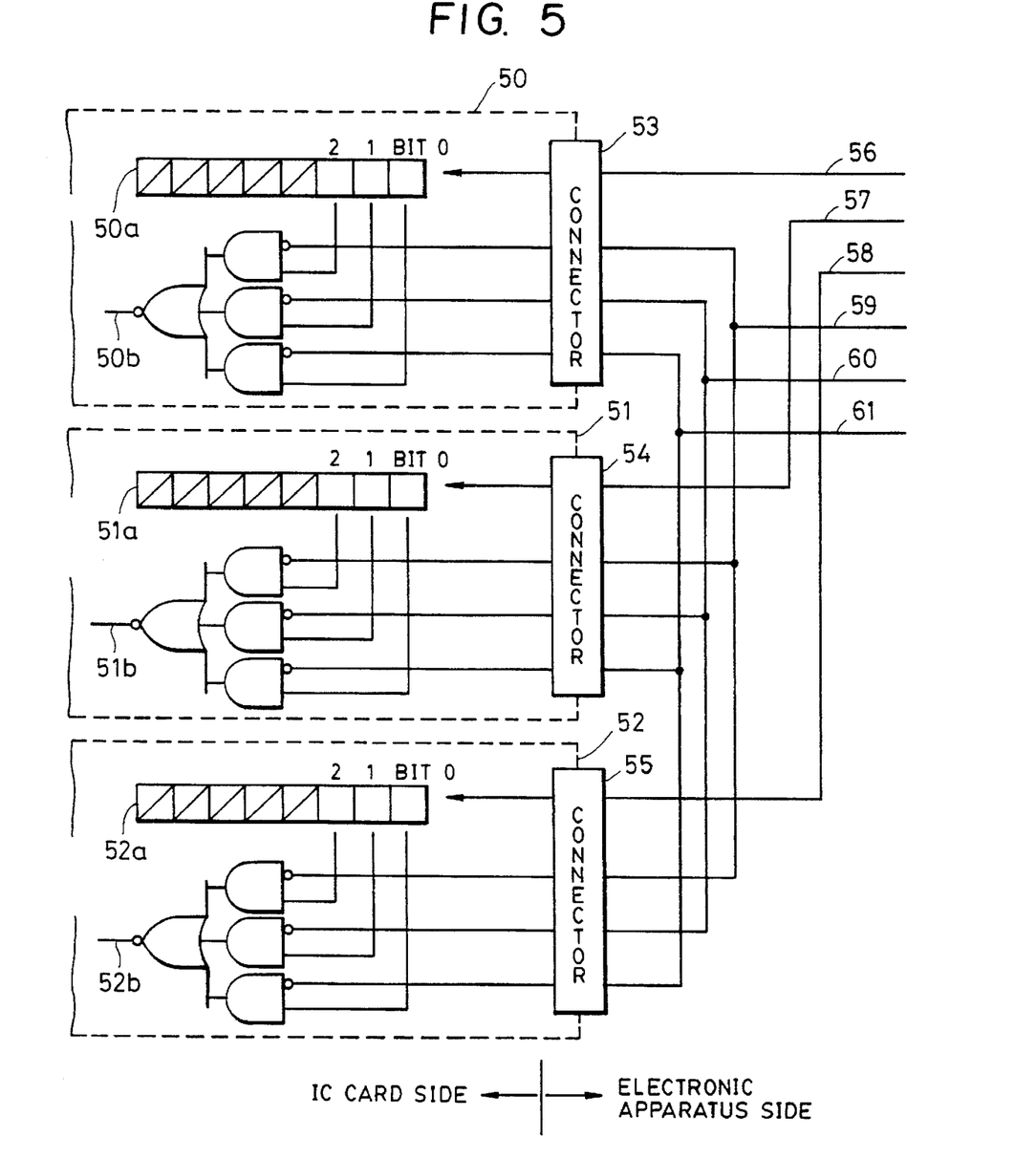
FIGS. 5 and 6 are schematic circuit diagrams showing circuits near connectors in another embodiment of the present invention.

FIG. 5 show a second embodiment in which IC cards 50-52 are connected to connectors 53-55 respectively. Contrary to the first embodiment, chip-selection lines are provided in the IC cards. Although not illustrated, address buses, data buses and various kinds of control lines are also connected to the connectors. IC cards 50, 51 and 52 house registers 50a, 51a, and 52a, respectively, and chip-selection lines 50b, 51b, and 52b, respectively.

The structure of the second embodiment is identical to the first embodiment, except that the registers and chip-selection control circuit are housed in IC cards, three connectors are used, lines 56-61 are connected to the address decoder, and connectors 53-55 are connected to address and data buses that connect all the elements of this embodiment.

Registers 50a, 51a and 52a for selection control correspond to the register 30 which has been explained in the first embodiment. By making active a signal line 56 for selecting the register 50a within the IC card 50 connected to the connector 53, it becomes possible to modify the contents of the register 50a. Similarly, signals transmitted over signal lines 57 and 58, when these lines are made active, can modify the contents of the registers 51a and 52a of the IC cards 51 and 52 connected to the connectors 54 and 55, respectively. Also provided are a selection line 59 for the extended RAM card, a selection line 60 for the SVC card, and a selection line 61 for the font ROM card. Signals are output from an address converter (not illustrated) through the lines 56-61.

In the present embodiment it is possible to securely access only one IC card when a certain kind of card is to be accessed, by the CPU writing the corresponding data in the registers 50a-52a within the IC cards 50-52, respectively, in order to assign a connector for each IC card. In other words, in each register, it becomes possible to set which of the lines 59-61 is to be selected to make it a chip-selection circuit.

Suppose, for example, that data "04H" are written (only bit 2 becomes "1") in the register 50a, data "02H" are written (only bit 1 becomes "1") in the register 51a, and data "01H" are written (only bit 0 becomes "1") in the register 52a. When the line 59 is then made active in order to access the extended RAM card, only the IC card 50 becomes accessible. Similarly, when line 60 is then made active to access the SVC card, only the IC card 51 becomes accessible, and when line 61 is made active to access the font ROM card, only IC card 52 becomes accessible. CPU 1 can write "1" or "0" into bits 0, 1, or 2, in registers 50a, 50b, or 50c, thereby permitting access to any of the cards 50-52 when any of the lines 59-61 are made active.

Figure 6:
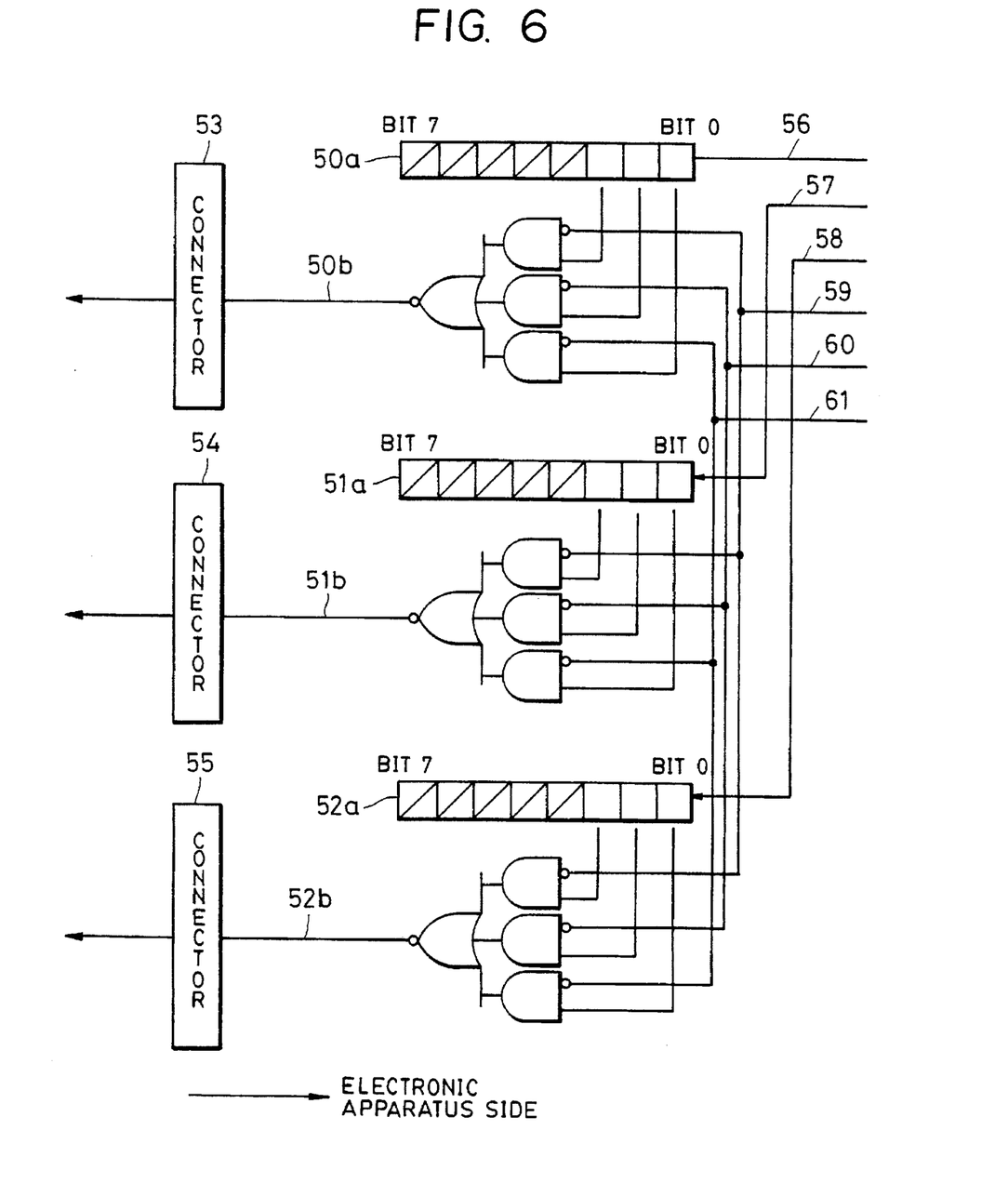

FIG. 6 shows an alternative embodiment in which each register and gate are provided in the body of the electronic apparatus in FIG. 5. Elements having the same numerals as those in FIG. 5 have the same or similar functions, and an explanation thereof will be omitted.

In the alternative embodiment of FIG. 6 the layout of pins at the connecting member of each IC card may be identical. That is, chip-selection lines of all IC cards may be provided at the same position. Consequently, it becomes unnecessary to provide chip-selection lines for connecting different kinds of IC cards to connectors on the body side of the electronic apparatus. Hence, the connectors on the body side of the electronic apparatus and the connectors of the IC Cards side may consist of identical connectors, irrespective of the kinds of IC cards. Thus, it becomes possible to reduce the production cost of the apparatus.

As explained above, according to the present embodiments, when plural IC cards having an identical function are connected, it never happens that these IC cards are simultaneously accessed. Hence, an unauthorized operation does not occur.

The individual components represented by the blocks shown in FIGS. 1–3 and 5–6 are all well known in the printing art and their specific construction and operation is not critical to the operation or best mode for carrying out the invention. Moreover, the steps illustrated in FIGS. 4, 4A, and 4B can be easily programmed into well known central processing units by persons of ordinary skill and since such programming per se is not part of this invention no further description thereof is deemed necessary.

What is claimed is:

1. An electronic apparatus comprising:

a plurality of connectors, each connector electrically detachably connecting one of a plurality of kinds of integrated circuit cards:

address decoding means for receiving and decoding address data to determine the kind of integrated circuit card corresponding to the address data, wherein said address decoding means comprises a plurality of card selection lines, wherein the number of said card selection lines equals the number of said plurality of kinds of integrated circuit cards, wherein each card selection line corresponds to a different kind of integrated circuit card, wherein said address decoding means outputs a card selection signal selecting the kind of integrated circuit card corresponding to the decoded address data over the card selection line corresponding to the kind of integrated circuit card specified by the address data;

setting means for setting an arbitrary one of said plurality of connectors through which a particular kind of integrated circuit card will be activated for each of the plurality of kinds of integrated circuit cards, respectively;

storing means, provided in the apparatus, for storing connector selection data specifying one of the plurality of connectors for each of said plurality of card selection lines, respectively, wherein the connector selection data specifies a connector, which is set for a particular kind of integrated circuit card by said setting means, for the card selection line corresponding to the particular kind of integrated circuit card specified by the address data; and selection control means, connected to said address decoding means by said plurality of card selection lines and connected to said storing means, and comprising a plurality of groups of connector selection lines, wherein each group of connector selection lines is connected to a respective one of said plurality of connectors, wherein the number of said connector selection lines in each group equals the number of kinds of integrated circuit cards and equals the number of card selection lines, wherein each card selection line in one group corresponds to a different kind of integrated circuit card, wherein said selection control means receives the card selection signal output from said address decoding means over one of the card selection lines and activates the connector selection line connected to the connector specified by the connector selection data corresponding to the card selection line from which the card selection signal is received.

2. An electronic apparatus according to claim 1, wherein said plurality of connectors have a substantially identical shape, dimension and structure.

3. An electronic apparatus according to claim 1, wherein said storing means is a single memory device.

4. An electronic apparatus comprising:

a plurality of connectors, each connector electrically detachably connecting one of a plurality of kinds of memory cards;

address decoding means for receiving and decoding address data to determine the kind of memory card corresponding to the address data, wherein said address decoding means comprises a plurality of card selection lines, wherein the number of the card selection lines equals the number of the plurality of kinds of memory cards, wherein each card selection line corresponds to a different kind of memory card, wherein said address decoding means outputs a memory card selection signal selecting the kind of memory card corresponding to the decoded address data over the card selection line corresponding to the kind of memory card specified by the address data;

setting means for setting an arbitrary one of said plurality of connectors through which a particular kind of memory card will be activated for each of the plurality of kinds of memory cards, respectively;

storing means, provided in the apparatus individually for each of said plurality of connectors, for storing connector selection data specifying whether or not the corresponding connector is to be selected for each of said plurality of card selection lines, respectively, wherein the connector selection data for a connector, which is set for a particular kind of memory card by said setting means, specifies the corresponding connector to be selected for the card selection line corresponding to the particular kind of memory card specified by the address data; and a plurality of selection control means, each connected to a respective one connector by a connector selection line corresponding thereto and connected to said storing means corresponding to the respective connector and connected to said address decoding means by all of said plurality of card selection lines, and wherein said plurality of selection control means comprise a plurality of connector selection lines, wherein each of said selection control means receives the card selection signal output from said address decoding means over one of the card selection lines and activates the respective connector selection line if the connector connected to the respective connector selection line is specified to be selected for the card selection line from which the card selection signal is received, by the connector selection data.

5. An electronic apparatus according to claim 4, wherein each of said plurality of connectors has a unique chip-selection line terminal.

* * * * *

UNITED STATES PATENT AND TRADEMARK OFFICE
CERTIFICATE OF CORRECTION

PATENT NO. : 5,630,167
DATED : May 13, 1997
INVENTOR(S) : NAOHIRO HOSOKAWA

It is certified that error appears in the above-identified patent and that said Letters Patent is hereby corrected as shown below:

COLUMN 1

Line 40, "signals" should read --signal--.

COLUMN 5

Line 5, "Which" should read --which--.

Signed and Sealed this

Tenth Day of March, 1998

Attest:

BRUCE LEHMAN

Attesting Officer        Commissioner of Patents and Trademarks